(12) United States Patent
Wennerberg et al.

(10) Patent No.: US 7,284,425 B2
(45) Date of Patent: Oct. 23, 2007

(54) RADAR LEVEL GAUGE SYSTEM

(75) Inventors: Tomas Wennerberg, Göteborg (SE); Olov Edvardsson, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 209 days.

(21) Appl. No.: 11/038,836

(22) Filed: Jan. 20, 2005

(65) Prior Publication Data

US 2006/0137446 A1 Jun. 29, 2006

(30) Foreign Application Priority Data

Dec. 23, 2004 (SE) .................................. 0403165

(51) Int. Cl.
*G01F 23/00* (2006.01)
*G01F 23/28* (2006.01)
(52) U.S. Cl. .................................................. 73/290 V
(58) Field of Classification Search ............... 73/290 V
See application file for complete search history.

(56) References Cited

U.S. PATENT DOCUMENTS

| | | | | |
|---|---|---|---|---|
| 4,992,998 | A * | 2/1991 | Woodward | 367/99 |
| 5,948,979 | A * | 9/1999 | Fitsch et al. | 73/290 V |
| 5,973,637 | A | 10/1999 | Perdue et al. | 342/124 |
| 6,504,793 | B2 | 1/2003 | Fuenfgeld | 367/99 |
| 6,634,228 | B2 | 10/2003 | Deserno et al. | 73/290 V |
| 6,684,919 | B2 | 2/2004 | Gaiser | 141/95 |
| 6,759,976 | B1 * | 7/2004 | Edvardsson | 342/124 |
| 6,759,977 | B1 | 7/2004 | Edvardsson et al. | 342/124 |
| 6,922,150 | B2 * | 7/2005 | Hang, II et al. | 340/612 |
| 2004/0036617 | A1 * | 2/2004 | Hall et al. | 340/612 |
| 2004/0257269 | A1 | 12/2004 | Laun | 342/124 |
| 2005/0052314 | A1 * | 3/2005 | Spanke et al. | 342/124 |
| 2006/0137446 | A1 * | 6/2006 | Wennerberg et al. | 73/290 V |

FOREIGN PATENT DOCUMENTS

| | | |
|---|---|---|
| DE | 42 34 300 A1 | 4/1994 |
| DE | 102 60 962 A1 | 7/2004 |
| EP | 1128169 A1 | 8/2001 |
| WO | WO 03/016835 | 2/2003 |
| WO | WO 2004/010093 | 1/2004 |

\* cited by examiner

*Primary Examiner*—Hezron Williams
*Assistant Examiner*—Samir M. Shah
(74) *Attorney, Agent, or Firm*—Westman, Champlin & Kelly, P.A.

(57) ABSTRACT

A method and a system for radar-based gauging of a filling level of a filling material is disclosed, wherein the tank has at least one interfering structure. The method comprises: transmitting at a first time moment a microwave signal towards the surface of the filling material; receiving microwave signals as reflected against the surface of the filling material and as reflected against said at least one interfering structure; calculating based on propagation times of the transmitted and reflected microwave signals at least two distances to reflective surfaces in the tank; and repeating at a second time moment the transmitting, the detecting and the calculating, wherein said first time moment is timely separated from said second time moment. Based on the several repeated measurements, the distance to the surface of the filling material is determined as the calculated distance that exhibits the greatest change between said first and second time moments. Based on this time difference analysis, it is possible to distinguish moving surfaces very easy and acurate. The method is specifically advantageous in overfill or high level alarm systems.

40 Claims, 4 Drawing Sheets

RADAR LEVEL GAUGE SYSTEM

The present application is based on and claims the benefit of Swedish patent application Serial No. 0403165-4, Dec. 23, 2004, the contents of which are hereby incorporated by reference in their entirety.

FIELD OF THE INVENTION

The present invention relates to a radar level gauge system for determining the filling level of a filling material in a tank, comprising a transmitter for emitting measuring signals towards the surface of the filling material; a receiver for receiving echo signals from the tank; and processing circuitry for determining the filling level of the tank based on said echo signal. More specifically the invention relates to a radar level gauge system to be used in tanks having at least one interfering structure which reflects the emitted measuring signals. Further, the invention also relates to a corresponding method for determining the filling level of a filling material in a tank.

BACKGROUND OF THE INVENTION

Radar level gauging (RLG) to measure the level of a filling material, such as a liquid or a solid like a granulate is an increasingly important method for level gauging in tanks, containers, etc. The process of radar level gauging generally can be divided into three steps:

Searching: finding the correct surface echo among possible disturbing echoes.
Tracking: following the found surface echo during various changing conditions.
Accuracy: requirements for accuracy during typical tank conditions which typically are much more diversified than the usually cited "instrument accuracy".

For radar level gauging the conditions are very different for different applications. For instance the mm-accuracy in CTS-applications (custody transfer system) requires a very strict control of installation conditions. Such accuracy is nowadays practically feasible in marine and refinery installations but generally not easy to obtain in typical process applications due to the abundance of disturbing echoes. However, more or less all present RLGs on the market are optimized under the assumption of an easy echo situation where the surface echo generally can be distinguished by its strength. That is a natural development from the oldest RLG applications like the marine use where installation conditions are somewhat controllable and the CTS application in big refinery tanks where the distance to disturbing objects typically is as big as desired. In typical process tanks the distance to the walls is much smaller and a turbulent surface is a normal situation. Thus, the task of finding and tracking the right surface is much more difficult in a process tank than in for instance a refinery tank. From that background, it can be questioned whether an echo finding logic based on a echo logic for relatively easy conditions, improved by a number of more or less concurrent improvements really can be sufficient as compared to a logic directly developed for the actual situation. p Present RLGs typically use the information in FFT spectra to distinguish which echo corresponds to the surface to be measured. The FFT spectra reflects the reflected energy at different distances. Consequently, the FFT spectra is normally a rather inaccurate means for distinguishing between e.g. a stationary object, a turbulent filling material surface and a moving agitator structure arranged in the tank. Further, it is normally difficult to distinguish the filling material surface when the tank is essentially empty and is starting to be filled. At this time, the filling material surface is also rather turbulent. Still further, strong echoes from stationary objects and structures in the tank would intervene in the measurement, and the tracking functionality could easily be fooled to lock on an erroneous echo, or lose the filling material surface echo when close to a disturbing echo.

In existing RLG systems, different hardware related means have been proposed to select and maintain the selection of the right surface echo. For example, a narrow antenna beam reducing the amplitude of echoes from disturbing echoes such as constriction steel beams etc. have been used. Unfortunately, a more narrow antenna beam requires a bigger antenna diameter which may be incompatible with existing mounting holes. Consequently, the number of disturbing echoes occurring in the raw signal generally is bigger than desired in typical process tanks. Further, a range gating function is often normally implemented in the software. Regardless if the system is of FMWC or pulsed type, a "tank spectrum" can be used as a tool for selection of the most likely echo. The tank spectrum is a detected tank signal where the amplitude is only used in combination with suitable logical decisions. Still further, a function for measuring the amplitude and a related threshold is conventionally needed to discriminate noise or irrelevant echoes from the true surface echo. This is also mainly a software function but needs certain calibration of amplifications etc. in order to tell the system what a "normal" echo should be. A more or less sophisticated echo logic could also be used in processing the echoes which have passed the test with sufficient amplitude and sufficient similarity to already verified echoes. However, there is still a need for improved radar level gauging, especially for tanks having interfering structures generating reflecting signals.

In order to improve the situation various solutions have been proposed. Receiving the echo in two polarizations (with a slightly more complicated antenna/microwave module) and comparing the received signal is one method to increase the ability to distinguish a surface echo from less symmetric disturbing echoes. In this respect, see e.g. U.S. Pat. No. 6,759,976. The time variation of the echo amplitude is another way which may be combined with the polarization and which is useful for a turbulent surface. A third method is to use a still more complicated antenna for creating a few different antenna lobes (or a slightly non-vertical lobe rotating around the plumb-line) all in the ideal case giving the same surface echo but greatly different echoes from disturbing structures which typically are non-symmetric located. In this respect, see e.g. U.S. Pat. No. 6,759,977. These methods may be efficient but unfortunately they require extra hardware, and is therefore normally more expensive and more cumbersome to produce and install. Further, such system will normally require more time and development resources.

In order to improve the situation various solutions have been proposed. Receiving the echo in two polarizations (with a slightly more complicated antenna/microwave module) and comparing the received signal is one method to increase the ability to distinguish a surface echo from less symmetric disturbing echoes. In this respect, see e.g. U.S. Pat. No. 6,759,976. The time variation of the echo amplitude is another way which may be combined with the polarization and which is useful for a turbulent surface. A third method is to use a still more complicated antenna for creating a few different antenna lobes (or a slightly non-vertical lobe rotating around the plumb-line) all in the ideal case giving the same surface echo but greatly different echoes from disturbing structures which typically are non-symmetric located. In this respect, see e.g. U.S. Pat. No. 6,759,977. These methods may be efficient but unfortunately they require extra hardware, and is therefore normally more expensive and more cumbersome to produce and install. Further, such system will normally require more time and development resources.

Further, it is known, e.g. from EP 1 128 169 to use difference signals in order to improve the resolution or accuracy of RLG-systems. However, these known methods are proposed for different reasons than as a remedy to the above-discussed problems.

Thus, there is still a need for an improved RLG system that could alleviate the above-discussed problems.

SUMMARY OF THE INVENTION

It is therefore an object of the present invention to provide a radar level gauge system and a method of determining the filling level of a filling material, which at least partly alleviate the above-discussed problems of the prior art.

This object is achieved with a radar level gauge system and a method according to the appended claims.

According to a first aspect of the invention, there is provided a method for microwave signal based gauging of a distance to a surface with reflective properties at a filling level of a filling material in a tank having at least one interfering structure having a surface with reflective properties, comprising:

transmitting at a first time first transmit signals towards the surfaces;

receiving at essentially said first time first receive signals including a first surface echo;

recording first propagation properties of the first transmit and receive signals associated with the first surface echo;

transmitting at a second time second transmit signals towards the surfaces;

receiving at essentially said second time second receive signals including a second surface echo;

recording second propagation properties of the second transmit and receive signals associated with the second surface echo;

wherein the first time and the second time are temporally separated by a first separation time;

calculating a first difference between the first and second propagation properties;

transmitting at a third time third transmit signals towards the surfaces;

receiving at essentially said third time third receive signals including a third surface echo;

recording third propagation properties of the third transmit and receive signals associated with the third surface echo;

transmitting at a fourth time fourth transmit signals towards the surfaces;

receiving at essentially said fourth time fourth receive signals including a fourth surface echo;

recording fourth propagation properties of the fourth transmit and receive signals associated with the fourth surface echo;

wherein the third time and the fourth time are temporally separated by a second separation time;

calculating a second difference between the third and fourth propagation properties;

comparing the first and second differences;

selecting the greatest of said first and second differences as the difference associated with the surface of the filling material; and determining said distance to the selected surface of the filling material based on propagation properties of transmitted and received signals.

The determining of said distance to the selected surface of the filling material is preferably based on at least one of the recorded propagation properties. However, additionally or alternatively it is also feasible to use other propagation properties, e.g. from a different set of transmitted and received signals.

It is notable that the first and third times may occur essentially simultaneously. In this case, the first transmit signals may be identical to the third transmit signals, even though it may also be possible to use separate transmit signals, having e.g. different polarization. Further, the second and fourth times may occur essentially simultaneously, wherein the second transmit signals may be identical to the fourth transmit signals. However, the times may also be temporally separated. Optionally measurements could be added at one or more further time moments creating a set of measurements enabling more reliable conclusions when e.g. the level and amplitude values are fluctuating due to turbulence, etc.

The temporal separation between the first and second times and/or the third and fourth times is less than a maximum separation time. Preferably, said temporal separation is less than one hour, and preferably less than one minute and most preferably less than 10 seconds.

The new method of microwave signal or radar level gauging is especially suited for process applications with complicated tank situations. As compared to traditional radar level gauges the invention includes means enabling even small movements of the liquid surface to be used to distinguish the surface echo from non wanted echoes caused by disturbing objects.

It is notable that the present invention makes use of a difference based on the same measurement, but at different times, in order to distinguish events and changes that has occurred. Previously known difference signals, such as the one discussed in EP 1 128 169, are normally concentrated on the difference between different measurement situations, such as the difference between measurements performed in different medias, etc.

The difference analysis of the present invention provides a number of advantages, since the echoes corresponding to the filling material surface could be detected more easily and accurately. Thus, the present invention is usable as a complement to conventional RLG logics, to identify the surface during start-up, during the situation where the empty-tank condition is left, and the tank is starting to be filled, when the filling level passes reflecting structures in the tank, etc. The difference analysis is also useful for distinguishing between the echoes from moving objects, such as agitators, from stationary objects, such as baffles and beams.

The method may further comprise the steps of calculating, based on the recorded propagation properties, distances to reflective surfaces in the tank, wherein the difference between the propagation properties is preferably calculated as the difference between said calculated distances.

It is further preferred that the recorded propagation properties comprises at least one of phase information and amplitude information from the transmitted and received signals. Alternatively or additionally, it is also preferred that the calculation of a difference between the recorded propagation properties involves identification of at least one of a phase difference or an amplitude difference between the recorded propagation properties.

The use of the phase information in the signals has proven very efficient and accurate. However, the use of the amplitude information is, even though not as extensive as the phase information, fully adequate for most situations and applications. Amplitude could in the context of this application generally be comprehended as signal strength.

The method to search for the echoes exhibiting the greatest change over time can alternatively be described in the following way, in particular suited for the case where measurements at more than two time moments are used. From the gradual temporal change of the level or phase of two echoes it is possible to conclude whether the two echoes will coincide in the future or if they have been at the same level earlier, both conclusions taken from a linear extrapolation of the change based on two or more time moments. The event of predicted or passed coincidence is called intercept, and in the case of an intercept below the present average level of the two surfaces the upper level is the liquid surface while an intercept above the average present level indicates that the lower level is the liquid surface.

Preferably, the method comprises repeating at least three temporally separated times the transmitting, the detecting and the calculating; wherein the distance to the surface of the filling material is determined as the calculated distance that exhibits the greatest change between said different time moments. Such difference analysis with several previous time moments make it possible to distinguish both slow and more rapid movements and changes. Further, this will preclude the possibility that the surface has moved exactly a multiple of $\lambda/2$ between two events, which would make even a moving echo disappear. Here, $\lambda$ is the wavelength of the radar waves, and for a 5.8 GHz frequency $\lambda$ will be 52 mm, etc.

The method is particularly useful for high-level or overfill alarm systems, since the new method is particularly useful for identifying moving surfaces, and since only moving surfaces are of interest for overfill considerations. Such systems could be dedicated to this single use, or be a functionality incorporated in a general RLG system. The high-level or overfill alarm functionality could involve comparing the determined distance to the filling material to at least one predetermined threshold level value. In use as high-level or overfill alarm, the calculating of a difference between the propagation properties is preferably based on a comparison between distances calculated from said propagation properties. Hereby, the distances to the surface levels are continuously monitored, and the surface level changing most rapidly over time is automatically considered to be the surface level of the filling material. Alternatively or additionally, it is also possible to set the alarm when a surface movement occurs within a predetermined near zone. This situation could be recognized when a difference between the first and second propagation properties or the third and fourth propagation properties is identified to occur within a predetermined high level zone. A threshold value for the differences to be considered could also be established, in order to avoid noise related false alarms. Hereby, it is possible to prioritize signals occurring within the near zone when the difference identified for said signals is high.

The method is usable both when continuous signals are emitted, and wherein the distances are calculated based on a phase difference between the received echo signal and a reference signal, as in FMCW systems, and when pulsed signals are emitted, and wherein the distances are calculated based on the time between the emission of a pulsed signal and the reception of the echo of said signal.

It is preferred that the received signals are filtered for reducing noise related changes before recording of the propagation properties, or before using said recorded propagation properties for calculating a difference.

Preferably, only primary echo signals are considered for recording of propagation properties, whereas secondary double-bounce echoes are disregarded.

The method may further comprise the step of initially assuming that certain of the received surface echoes origins from the surface of the filling material, i.e. that the first and second surface echoes or the third and fourth surface echoes are reflected from the surface of the filling material. In this case, if the step of selecting the greatest of said first and second differences associates a different surface echo with the surface of the filling material, the assumption is thereafter preferably changed to the now selected surface echoes. The initial assumption is further preferably regularly tested and if necessary corrected within a limited time period, said time period being less than one hour, and preferably less than half an hour. Even more preferably, said time period is less than one minute, and most preferably less than 10 seconds.

Association of echo signals from temporally separated received signals with the assumption that they originate from the same reflective surface could be made in various ways, which are per se known in the art. This association between echo signals could be made directly upon reception of the signals, or subsequently based on the recorded propagation properties.

According to another aspect of the present invention, there is provided a method for microwave signal based gauging of a distance to a surface with reflective properties at a filling level of a filling material in a tank having at least one interfering structure, comprising:

transmitting at least two temporally separated times transmit signals into the tank, and subsequently receiving receive signals including surface echoes;

recording propagation properties of the transmit and receive signals in association with at least two distinguishable reflective surfaces;

calculating for each distinguishable reflective surface a difference in the recorded propagation properties between the at least two temporally separated times;

comparing the calculated differences for the at least two distinguishable reflective surfaces;

selecting the greatest of said differences as the difference associated with the surface of the filling material; and determining said distance to the selected surface of the filling material based on propagation properties of transmitted and received signals.

In accordance with this aspect, similar advantages and preferred features are obtainable as have already been discussed with respect to the first aspect.

According to still another aspect of the present invention, there is provided a radar level gauge system for determining a distance to a surface with reflective properties at a filling level of a filling material in a tank having at least one interfering structure, comprising:

a transmitter for transmitting measuring signals towards the surface of the filling material;

a receiver for receiving echo signals from the tank;

a storage for recording propagation properties of the transmit and receive signals in association with at least two distinguishable reflective surfaces;

processing circuitry for calculating for each distinguishable reflective surface a difference in the recorded propagation properties between at least two temporally separated times, and selecting the greatest of the calculated differences for the at least two distinguishable reflective surfaces as the difference associated with the surface of the filling material, and determining said distance to the selected surface of the filling material based on propagation properties of transmitted and received signals.

In accordance with this aspect, similar advantages and preferred features are obtainable as have already been discussed with respect to the first aspect.

The present invention is useful for level gauging in tanks having a filling material having a surface with reflective properties as well as at least one interfering structure having a surface with reflective properties. In particular the invention is useful when said reflective surfaces are separated, i.e. not on essentially the same level, and thus independently distinguishable in the reflected echo signals. The possibility of distinguishing the surfaces could depend on various parameters, such as one or several of: the separation distance, the level resolution of the measurement equipment, the signal strength, etc.

According to still another aspect of the present invention, there is provided a method for microwave signal based determination of a high-level or overfill situation for the filling level of a filling material in a tank having a surface with reflective properties, comprising:

transmitting at a first time first transmit signals towards the surfaces;

receiving at essentially said first time first receive signals including a first surface echo;

recording first propagation properties of the first transmit and receive signals associated with the first surface echo;

transmitting at a second time second transmit signals towards the surfaces;

receiving at essentially said second time second receive signals including a second surface echo;

recording second propagation properties of the second transmit and receive signals associated with the second surface echo;

wherein the first time and the second time are temporally separated by a first separation time;

calculating a first difference between the first and second propagation properties;

determine a distance to the surface of the filling material;

identifying if the difference exceeds a predetermined difference level and if the determined distance is within a predetermined high level zone, and if so setting the alarm.

It is to be noted that the invention according to this aspect is usable and useful also in tanks without any interfering structures. However, as will be appreciated by those versed in the art, this aspect of the invention makes use of the same underlying principles as discussed in association with the other aspects of the invention, and it is also to be noted that all features of said other aspects could also be used together with this last discussed aspect of the invention.

These and other aspects of the invention will be apparent from and elicited with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

Figure 1:
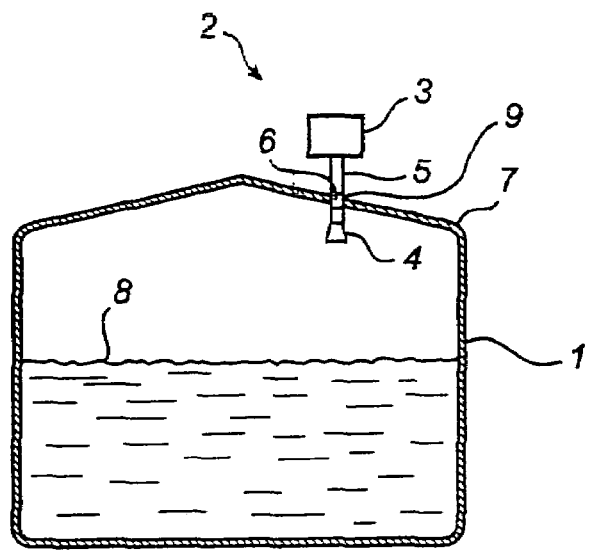
FIG. 1 is a schematic cross-sectional side view of a container, in which an antenna device according to the embodiment is arranged.

FIG. 1 shows schematically a radar level gauge system 1 in which the invention may be advantageously incorporated. In brief, the system in FIG. 1 comprises an electronic unit 3 for transmitting and receiving radar signals and processing the received signals in order to determine the level in the tank, an antenna 4 arranged inside the tank for transmitting and receiving radar waves into the tank, and a radar wave guide assembly 5 for guiding signals between the electronic unit 3 and the antenna 4. The same antenna could preferably be used both as a transmitter for emitting the output radiation and as a receiver for receiving the reflected echo signal, even though it is also possible to use separate antennas for these functions. The exemplifying embodiments of the invention uses radar antennas providing a free radar beam, in which case disturbing echoes are particularly frequent, but it is also possible to use the invention in guided radar systems, using a waveguiding structure for forwarding the emitted radar beam to and/or from the tank.

In use, the radar level gauge 2 transmits radar energy along the waveguide 5 through the tank roof port and receives reflected energy from the liquid surface 8 to provide an indication of the level of the liquid within the tank. The radar level gauge 2 could be coupled to a remote location (for example a control room) via a signal wire or the like.

The system may use pulsed or continuously emitted radiation. In case pulsed signals are used, the signals can be DC pulses with a length of about 2 ns or less, with a frequency in the order of MHz, at average power levels in the nW or µW area. Alternatively, the pulses are modulated on a carrier wave of a GHz frequency. If required, the tank is provided with a sealing, arranged to allow the electromagnetic signals to pass through the wall of the tank while maintaining an air tight seal, so as to prevent tank contents from escaping from the tank.

Figure 2:
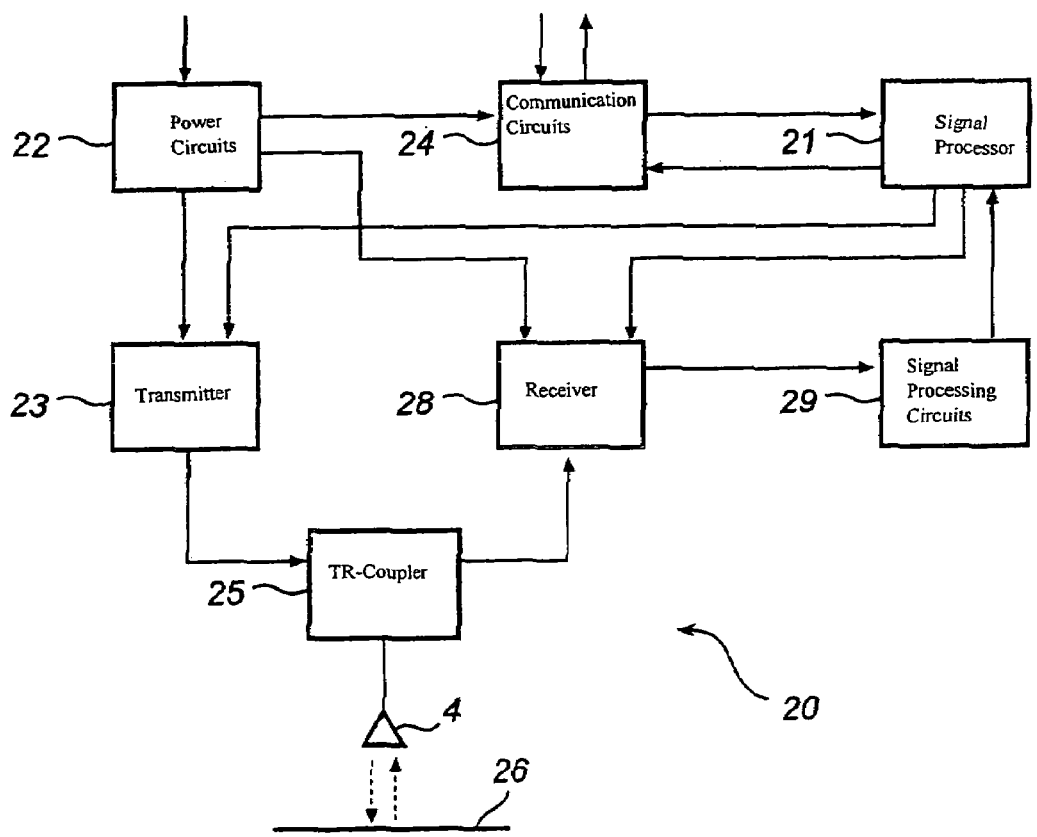
FIG. 2 is a schematic block diagram illustrating the radar level gauge system of FIG. 1.

In the general embodiment shown in FIG. 2, the circuitry 20 includes a signal processor 21, a transmitter 23, a receiver 28 and signal processing circuits 29 preparing the received signals to the processor 21. The circuitry further includes a transmit/receive (TR) coupler 25 which connects the transmitter 23 and the receiver 28 with the antenna 4 which is directing signals towards the surface 26 of the material the level of which is to be measured. The TR-coupler 25 can be a directional coupler, a ferrite circulator, a switch or any other conventional component. The circuitry also includes at least power circuits 22 and communication circuits 24 which both can be of many types.

The signal processor 21 is preferably a microprocessor based circuit adapted to receive the incoming signal, as discussed above, and provide as an output a signal or information indicative of the level of material 8. The functions and algorithms implemented by signal processor 21, some of which can be embodied in hardware and some of which can be embodied in software, are per se known from the art will not be discussed further in this application.

After reflection against the surface 26 the electromagnetic signals are received by the antenna 4, and forwarded back to the transceiver 10, where they are sampled and digitalized in a process controlled by a processing circuitry, such as a processor 21. The processor is provided with software for analyzing the signal in order to determine a the filling level in the tank, i.e. the level of the surface 26. The processor 21 is preferably a microprocessor based circuit adapted to receive the incoming signal, as discussed above, and provide as an output a signal or information indicative of the level of material 8. The functions and algorithms implemented by signal processor 21, some of which can be embodied in hardware and some of which can be embodied in software, are per se known from the art and will not be discussed further in this application. Especially, the method preferably comprises the, per se well-known functionality of searching in order to identify surface echoes among possible disturbing echoes, and tracking in order to follow the found surface echo during various changing conditions. Several surfaces generating reflecting signals could be monitored simultaneously, and typically the processing circuitry is arranged to manage monitoring of 5-10 such surface echoes simultaneously.

The signal processor 21 is preferably a microprocessor based circuit adapted to receive the incoming signal, as discussed above, and provide as an output a signal or information indicative of the level of material 8. The functions and algorithms implemented by signal processor 110, some of which can be embodied in hardware and some of which can be embodied in software, are per se known from the art will not be discussed further in this application.

After reflection against the surface 2, the electromagnetic signals are received by the antenna 12, and forwarded back to the transceiver 10, where they are sampled and digitalized in a process controlled by a processing circuitry, such as a processor 11. The processor is provided with software for analyzing the signal in order to determine a the filling level in the tank, i.e. the level of the surface 2. The processor 11 is preferably a microprocessor based circuit adapted to receive the incoming signal, as discussed above, and provide as an output a signal or information indicative of the level of material 3. The functions and algorithms implemented by signal processor 11, some of which can be embodied in hardware and some of which can be embodied in software, are per se known from the art and will not be discussed further in this application. Especially, the method preferably comprises the, per se well-known functionality of searching in order to identify surface echoes among possible disturbing echoes, and tracking in order to follow the found surface echo during various changing conditions. Several surfaces generating reflecting signals could be monitored simultaneously, and typically the processing circuitry is arranged to manage monitoring of 5-10 such surface echoes simultaneously.

For radar systems where two or more echoes are present there will normally be a limited resolution when the echoes are close to each other. Two fairly close echoes generally appear as two echoes, whereas when they are very close they will not be able to be distinguished but will appear as one single echo at an average distance, and between these two cases there is a transition region where the accuracy may be low. The limit is determined by the pulse time or the inverted bandwidth and is around 150 mm for a system having 1000 MHz bandwidth or 1 ns pulse time fairly independent of the type of system. The embodiments to be discussed resolve the echo situation at distances outside of this zone of less accuracy.

Further, there is provided means for assisting, in case several reflecting surfaces exist in the tank, which part of the received signal, and which calculated distance, that represents the surface of the filling level. This functionality is preferably mainly software related, and can in many cases be implemented on existing (or reasonably extended) hardware, and will work for FMWC as well as for pulsed systems. It can be used alone but also in combination with the methods mentioned above or with many other methods.

In a first embodiment, the phase information in the received signals is used. In this embodiment, a memory function is provided, where the raw tank-signal including the phase information is saved at suitable points of time. In a typical system the information in one "snapshot" (a sweep for a FMWC system or the corresponding interval for a pulsed system) is a few kbyte so the storage of a few "snapshots" is compatible with even a modest but modern processor with its RAM. A difference is formed between the most recent "snapshots" and one of the older ones and an essentially normal signal processing is performed on the difference. Supposing the surface has moved a bit between the two "snapshots" the different phase of the surface echoes most likely will create a non-zero difference, while all echoes above the surface will be cancelled. The optimal change in level is $\lambda/4$ (7 mm at 10 GHz) which will give opposite phase for the surface echo but preserved phase for disturbing echoes above the surface. However, already $\lambda/12$ (2.5 mm at 10 GHz) will give the original amplitude back when the difference is formed. With a typical surface velocity of a few cm per minute only a short time interval is needed (5-10 sec) and with the very common case with a turbulent surface the same case will apply even if the surface is not steadily moving. A few different "snapshots" are preferably saved and the interval for savings is supposedly matched to the movement so the best comparison can be made. The sampling is preferably done before any detection (which is commonly applied in present pulsed systems). For the described function it is preferred that the signal is treated linearly and that the phase is preserved. One standard way to do so is to save two signals 90 degrees out of phase, generally referred to as I and Q-channel.

Figure 4A:
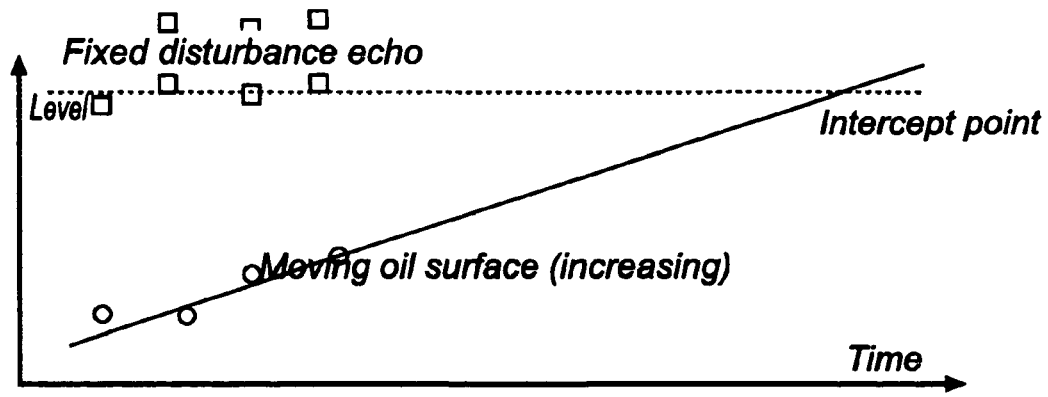
FIG. 4 illustrates a possible signal processing for use in the invention.
Figure 4B:
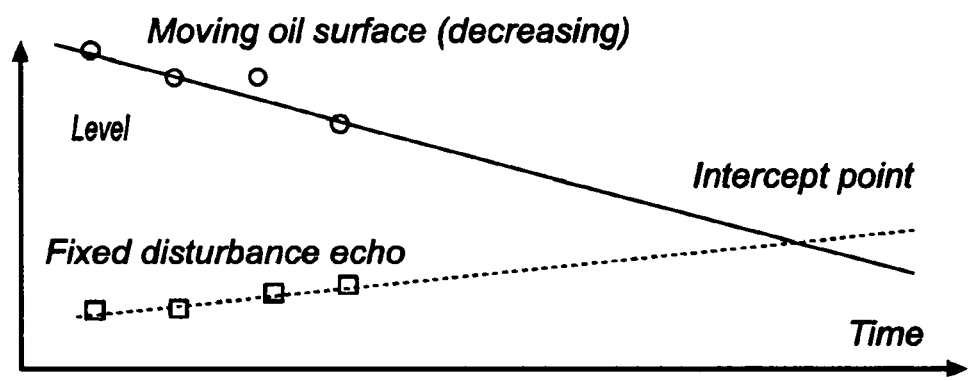
Figure 4C:
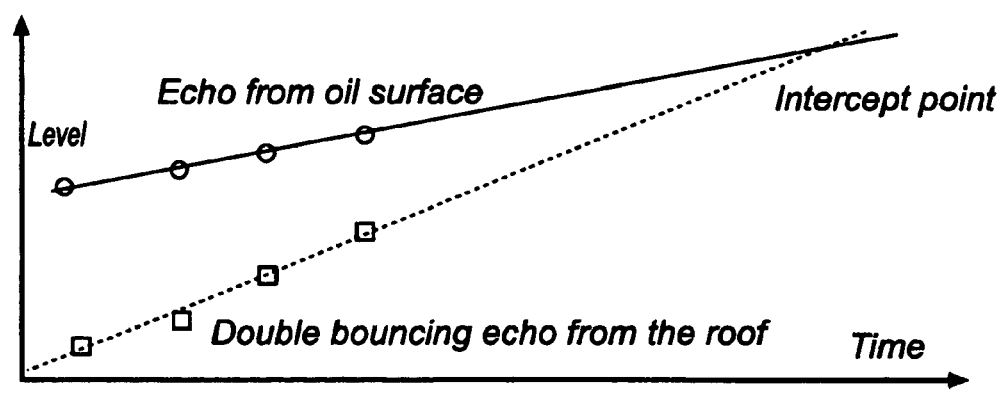

In many cases it is sufficient to make a comparison between two moments or times as described above and make conclusions from the difference. However in many practical cases there are variations in both measured level and amplitude depending on small movements in the surface or on a third disturbing echo both causing fairly rapid variation of the measured level or amplitude. Such variations might easily make a comparison to determine the "biggest change" ambiguous. By including more than two moments with their own measured values this ambiguity can be resolved by looking over the trend over a few different times rather than just the difference between two. This is illustrated by FIG. 4 where three different cases are illustrated each with a comparison between two echoes. In FIG. 4a a sequence of 4 levels (or phases) are put in a diagram against the time moments and estimated linear trends are indicated by lines. In FIG. 4a the upper echo is a disturbing echo (e.g. a tank structure) with a dotted trend line and the lower the echo from changing liquid surface with a solid trend curve. The intercept point between the two trend lines (Oust assuming constant velocity) gives the level where two echoes will coincide (in the future) or were at the same level (in the past). The "intercept level" is now close to the upper end of the level interval between said two echoes and the significance of this will be discussed further in the following. In FIG. 4b the disturbing echo is below the surface, and the corresponding set of measured levels at four different times will have a slightly different appearance. The disturbing echo is now measured through a variable thickness of at least partly radar transparent liquid and both the levels will have a variation but in opposite directions. The intercept level can still be defined but is now below the average between the two measured levels. This will hold both at increasing and decreasing level but the hypothetical moment of intercept will be different. In the third case, illustrated in FIG. 4c, a multiple echo from the tank roof (i.e. twice the distance) is compared to the normal surface echo in the same way. In this case the level of the intercept point will be higher than both the two measured levels and the multiple echo is revealed. It is obvious that at very smooth signals the result of this simple trend analysis in FIGS. 4a and 4b provide the same result as evaluation at greater change, but with a noise like disturbance the trend analysis will provide a safer result. The position of the intercept level could be used in the following way:

Intercept level below the average between the two measured levels implies that the highest level is the correct one.

Intercept level above the average level but below the highest one of the two (with a certain margin) implies that the lowest level should be used.

Intercept level above the highest level indicates that the highest level should be used due to the revealed existence of a multiple echo.

In e.g. software a suitable analysis of the degree of scattering is preferably provided for determining how many points that are required to include in the trend analysis. From the discussion above it is obvious for the skilled addressee that the conclusions are valid independent of the direction of the movements.

In many applications, the system must be able to measure under a non-moving surface too, and then the tank signal could be used in a conventional way. However, this only applies when the surface is neither moving nor turbulent and then the amplitude of the echo is at least 10-20 dB stronger than during turbulent conditions. Thus, the standard method is used during the most favorable conditions only. Alternatively, a combination of these methods is also feasible. For example, the methods could be operated continuously and in parallel, whereby the information from both could be extracted and compared for a more accurate determination of the surface. When no turbulence or movement is at hand, the result from the standard method will be used as it is, and when movements occurs the standard method could be used as a verification. Furthermore, the method allows the disturbing echoes with their phase to be stored so the especially strong echoes can be subtracted from the tank signal even for a steady surface echo. The subtraction of two echo signals recorded at two fairly close points of time is however more efficient as the disturbing echoes are "fresh" and have the same influence from sediments, temperature variations etc.

The above-discussed method can be applied to different kinds of RLG systems, among them the commonly used pulsed systems and FMWC systems. With a pulsed system short pulses are transmitted which each may be a 1 ns long pulse of a few 6 GHz periods. After reflection in the surface, the pulses are received and mixed with a similar pulse train having a slightly different PRF (such as 1.00000 MHz compared to 1.00001 MHz) and then, after low-pass filtering, the received pulses (repetitive over a fairly long time) are "stretched" in time to be easier to process. The mixing is linear so phase, amplitude and mixed signals are preserved, providing the pulses at a much slower rate ($10^{-5}$ in the example). One period of this stretched signal (100 ms in the example) is here called a "snapshot" of the tank signal. For a FMCW signal the IF signal ideally is a sum of sinusoidal signals, one for each echo with preserved phase and amplitude and with a length equal to the length of one sweep (e.g. 100 ms). The signal processing in a modern system can be supposed to include one or more FFTs and at this stage the difference in signal processing between a pulsed and a FMCW system can be said to be reduced to whether an odd or even number of FFTs are applied. The term "generic IF signals" is used for both pulsed systems, FMCW systems or other radar systems giving a linear combination of echoes from possibly many echoes with preserved amplitude, phase etc.

The above-discussed method can be applied to different kinds of RLG systems, among them the commonly used pulsed systems and FMWC systems. With a pulsed system short pulses are transmitted which each may be a 1 ns long pulse of a few 6 GHz periods. After reflection in the surface the pulses are received and mixed with a similar pulse train having a slightly different PRF (such as 1.00000 MHz compared to 1.00001 MHz) and then, after low-pass filtering, the received pulses (repetitive over a fairly long time) are "stretched" in time to be easier to process. The mixing is linear so phase, amplitude and mixed signals are preserved, providing the pulses at a much slower rate ($10^{-5}$ in the example). One period of this stretched signal (100 ms in the example) is here called a "snapshot" of the tank signal. For a FMCW signal the IF signal ideally is a sum of sinusoidal signals, one for each echo with preserved phase and amplitude and with a length equal to the length of one sweep (e.g. 100 ms). The signal processing in a modern system can be supposed to include one or more FFTs and at this stage the difference in signal processing between a pulsed and a FMCW system can be said to be reduced to weather an odd or even number of FFTs are applied. The term "generic IF signals" is used for both pulsed systems, FMCW systems or other radar systems giving a linear combination of echoes from possibly many echoes with preserved amplitude, phase etc.

The snapshots from the generic IF signals at one or more points of time are preferably stored in a storage in the described system. With typical parameters one snapshot is well preserved by taking around 1000 samples with 8-16 bits of amplitude resolution. Thus, a few or up to 10 kbytes of storage space is required for each snapshot making the storage of a few snapshots easy to obtain even with a limited storage space in a modern digital processor. In existing systems today 1000 samples is a typical amount so the hardware requirements are compatible with the industrial RLG standard today.

Forming the difference between any two snapshots from different points of time is easily done. One important observations is that a static echo will essentially disappear in the difference while a moving echo generally will give a non-zero contribution to the difference. The storage of a few different snapshots will preclude the possibility that the surface has moved exactly a multiple of /2 between two events making even a moving echo disappear. A fairly small movement is required to make the difference distinctly non-zero and for instance /12 change of the level will give 60 degrees phase difference and the same amplitude in the differential snapshot as in the originals. If we suppose 10 dB signal reduction before processing should be acceptable, then even a 1 mm change in a 10 GHz system is acceptable to distinguish the true surface.

For a FMCW system the difference signal for a moving echo will obviously be similar to the original echo but with another amplitude and phase which in the normal type of signal processing will not have any influence on the calculated distance. For a pulsed signal the difference will be very similar to supposing the time difference is small as compared to the pulse time (which in terms corresponds to a distance in the order of 100 mm). Even in a pulse the most information is in the phase. For the pulse case it is preferred that the signal before video detection is used (where the two pulses have different phase) as the two detected signals from slightly different points of time are very similar and will not form any usable difference.

Any echo from any structure above the liquid surface will virtually disappear while the surface echo will remain with a likely change in amplitude which can be chosen by having a limited choice of snapshots. Thus, the surface echo will be much cleaner and even more important it will become the closest non-zero echo even in situations where there are many strong disturbing echoes present.

In case of smooth surface tank structures above the surface, those could be reflected via a reflection in the surface (double bouncing) and may appear as echoes more distant than the surface and moving at twice the rate when the surface moves. With a more complex calculation all echoes appearing to be more than the calculated surface can get their phase changed according to the calculated surface. A number of trial calculations will reveal the correct assumption.

A few liquids are transparent for radar waves and in that case echoes below the surface will be visible and they will appear to move too as the surface moves. They will however appear to move in the opposite direction and slower. A related type of algorithm as for echoes above the surface will make it possible to remove these echoes too before the final accurate calculation takes place.

A radar level gauge may have different uses and one crucial use is as an overfill alarm. The described method is well suited for this task as it will enable the detection of even weak but somewhat moving echoes in an accurate defined near vicinity of the radar level gauge. The echo situation in the near vicinity of the gauge is fairly static so the instrument can be made sensitive to any change which in this part of the tank most likely is caused by the rising liquid surface.

In the previously discussed embodiment, the phase information in the received signals was used to distinguish a moving surface from a non-moving surface, and thereby to identify reflective signal from the surface of the filling material from disturbing echoes. However, it is also possible to use signals without phase information to essentially the same end. Such an embodiment will now be discussed more thoroughly.

In this embodiment, a difference spectrum is formed for the amplitude in each position, and comparing signals received at different times, from which the echo characteristics are determinable.

The difference in amplitude for a position n at a time t could be determined as:

$$\text{AmplDiff}(n)_t = \text{Ampl}(n)_t - \text{Ampl}(n)_{t-1}$$

Alternatively the difference could be determined as:

$$\text{AmplDiff}(n)_t = \text{Abs}(\text{Ampl}(n)_t - \text{Ampl}(n)_{t-1})$$

The amplitude difference is further preferably filtered, in order to avoid noise generated disturbances, e.g. in the following way:

FiltFactor=90%

$$\text{FiltAmplDiff}(n)_t = \text{FiltFactor} \times \text{FiltAmplDiff}(n)_{t-1} + (1-\text{FiltFactor}) \times \text{AmplDiff}(n)_t$$

By means of the comparison between signals from different times, the difference analysis will generate a clear indication of moving surfaces, such as a turbulent surface, a surface that is raised or lowered, or moving agitators. However, a stationary surface will essentially not be visible, such as beams, baffles, etc. The same is true for a totally still filling material surface.

When movement occurs in the tank, the signal/noise ratio in the difference spectrum will be greater than that in the standard "tank spectrum". Also, as mentioned previously, static echoes will not be present in the difference spectrum. Thus, turbulence, a boiling product or a moving surface, actually makes it easier to determine the correct surface echo using the new method compared to using more traditional echo logic even under calm conditions.

Figure 3A:
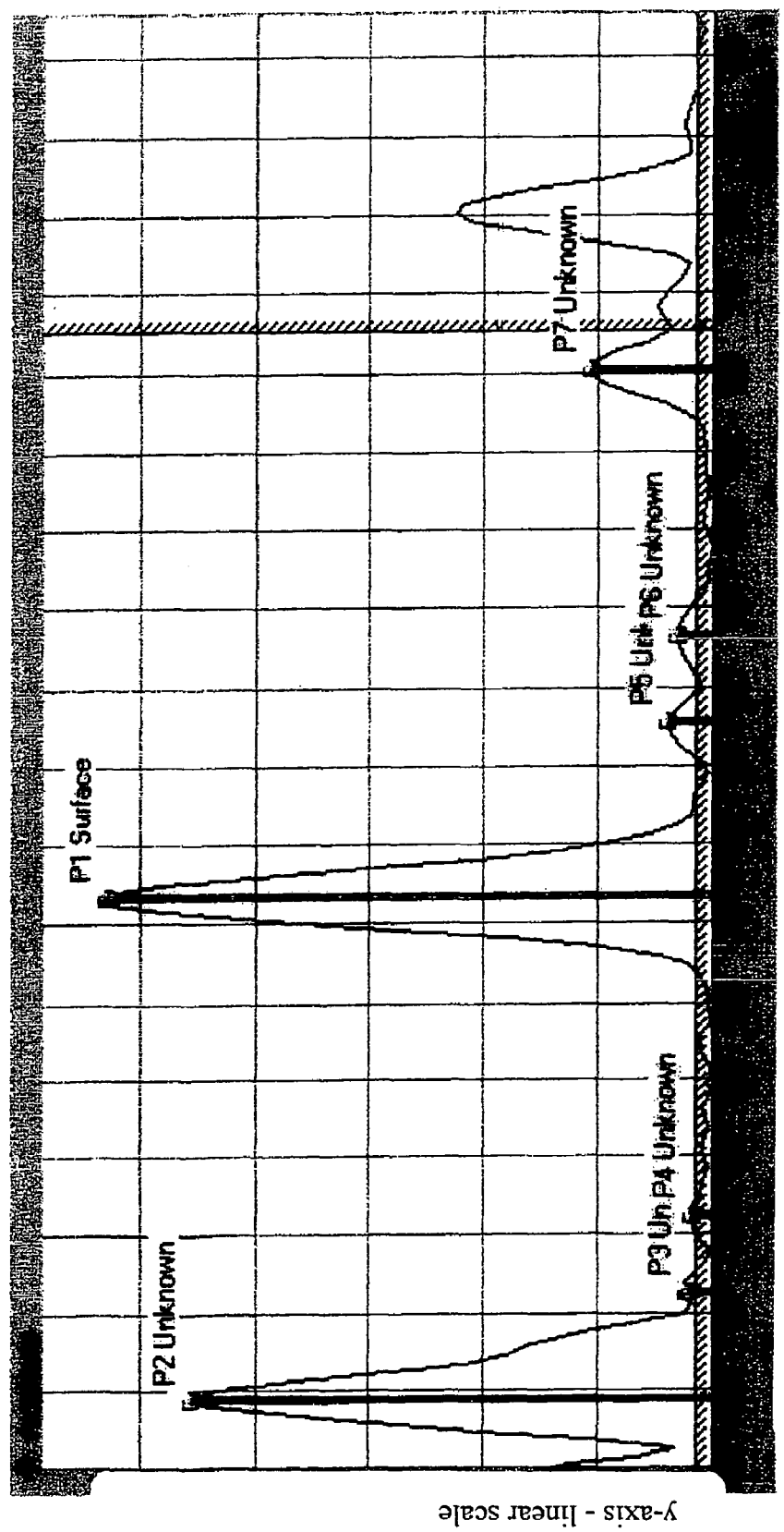
FIG. 3 are some schematic diagrams representing different signal spectra for an exemplary tank situation.

The information obtainable from the difference signal will now be discussed in more detail with reference to an example. In the diagram in FIG. 3a, an exemplary tank spectrum is illustrated, where the y-axis represents the amplitude in a linear scale, and the x-axis represents the distance (0.0-9.0 m), also in a linear scale. In this spectrum, the peak representing the surface at 3.7 m is clearly visible, but also other peaks are visible, especially a strong disturbance echo at 0.5 m. Judging from this information only it is difficult to tell which of the peaks that represents the surface echo.

Figure 3B:
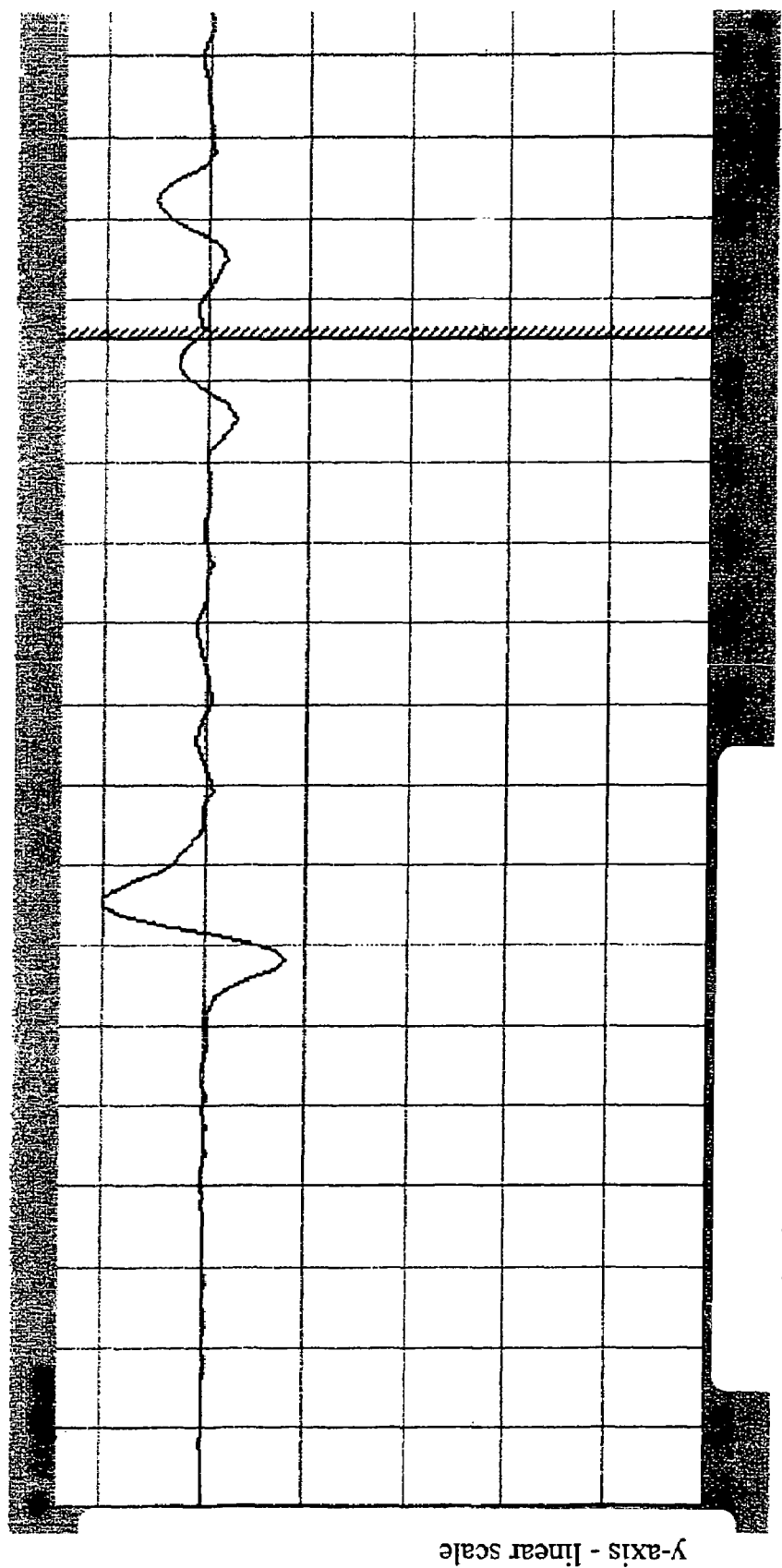

In FIG. 3b, a difference spectrum is illustrated for the same tank situation. In this diagram it is easy to recognize where there is movement in the tank. Up until 3.0 m there is no movement and the strong disturbance echo at 0.5 m can therefore be discriminated. The s-shaped curve starting at 3.0 m up until 4.0 m also defines in which direction the echo is moving (in this case the surface is lowered).

Preferably, the difference analysis makes use of received signals from at least two, and preferably several previous times, and preferably with different timely separation. Hereby, it becomes possible to detect and distinguish between both slow movements such as slowly raised or lowered filling level, and more rapid movements, such as turbulence at the surface. Further, this extended analysis makes it possible to avoid the situation where the difference between two received signals corresponds to exactly a multiple of /2, which would make even a moving echo disappear. For example, the difference analysis for signals received at a time t could be made based on e.g. measurements at t-1, t-10 and t-100.

The above-discussed method and system is particularly useful for overfill applications. In such an overfill application, the determined surface level could be compared with one or several threshold values, and e.g. a set of the following three threshold values:

OFA_LowLimit, which is a lower limit for the range to be monitored

OFA_HighLimit, which is the upper limit for said range,

OFA_AmpThreshold, which is a threshold value for an amplitude that could generate the alarm within the range.

It is naturally important that the threshold values are chosen properly, so that no surface echoes are missed, but at the same time that false alarms due to other reflections, noise etc, are avoided as far as possible. Thus, overfill alarm functionality has previously been difficult to realize in practice, and has normally required substantial and cumbersome configuration for each individual use situation. However, with the above-discussed time differential spectra, which are able to detect changes and events that occurs over time, a much higher reliability could be obtained, which makes the overfill alarm easier to produce and install. A threshold value for the amplitude would normally be needed even when the differential analysis discussed above is used. However, in that case, this threshold value could be set as a general parameter, independent of the filling material, the tank environment, etc. Consequently, a constant threshold could be used regardless of where and how the system is installed.

The gauge system could further comprise an alarm (not shown), which is activated by said alarm signal. The alarm could e.g. be arranged in a control unit for the system. The alarm system may be distributed, whereby the alarm could be arranged at a distance from the gauge system. Alternatively, the alarm signal could be sent to a separate system, such as to a general control system. The alarm may be arranged close to the measuring equipment, or at a remote location (for example in a control room), wherein the alarm signals could be transferred via a signal wire or the like. The alarming unit can be designed in several ways to alert an operator about the current situation. As some examples: an acoustic signal can be activated, alarming lamps can start to light or twinkle or some kind of signaling can be activated on a control board, alarms on a computer screen or a remote unit (phone, minicall, radio, etc. ) could be activated, etc.

Specific embodiments of the invention have now been described. However, several alternatives are possible, as would be apparent for someone skilled in the art. For example, many different components may be used for performing the various functions of the level gauge system and the processing circuitry, as would be readily apparent for someone skilled in the art. Further, many different types of threshold values and alarm parameters may be used within the system as outlined above, the system may use pulsed or continuously transmitted measuring signals, the system may be a dedicated alarm system, or integrated in a conventional measuring system, etc. Such and other obvious modifications must be considered to be within the scope of the present invention, as it is defined by the appended claims.

What is claimed is:

1. A method for microwave signal based gauging of a distance to a surface with reflective properties at a filling level of a filling material in a tank having at least one interfering structure having a surface with reflective properties, comprising:
   transmitting at a first time first transmit signals towards the surfaces;
   receiving at essentially said first time first receive signals including a first surface echo;
   recording first propagation properties of the first transmit and receive signals associated with the first surface echo;
   transmitting at a second time second transmit signals towards the surfaces;
   receiving at essentially said second time second receive signals including a second surface echo;
   recording second propagation properties of the second transmit and receive signals associated with the second surface echo;
   wherein the first time and the second time are temporally separated by a first separation time;
   calculating a first difference between the first and second propagation properties;
   transmitting at a third time third transmit signals towards the surfaces;
   receiving at essentially said third time third receive signals including a third surface echo;
   recording third propagation properties of the third transmit and receive signals associated with the third surface echo;
   transmitting at a fourth time fourth transmit signals towards the surfaces;
   receiving at essentially said fourth time fourth receive signals including a fourth surface echo;
   recording fourth propagation properties of the fourth transmit and receive signals associated with the fourth surface echo;
   wherein the third time and the fourth time are temporally separated by a second separation time;
   calculating a second difference between the third and fourth propagation properties;
   comparing the first and second differences;
   selecting the greatest of said first and second differences as the difference associated with the surface of the filling material; and
   determining said distance to said surface of the filling material based on propagation properties of said transmit and receive signals.

2. The method of claim 1, wherein the first and third times occur essentially simultaneously.

3. The method of claim 2, wherein the second and fourth times occur essentially simultaneously, and wherein the second transmit signals are identical to the fourth transmit signals.

4. The method of claim 1, wherein the first transmit signals are identical to the third transmit signals.

5. The method of claim 1, wherein the second transmit signals are identical to the fourth transmit signals.

6. The method of claim 1, further comprising the steps of calculating, based on the recorded propagation properties, distances to reflective surfaces in the tank, and wherein the difference between the propagation properties are calculated as the difference between said calculated distances.

7. The method of claim 1, wherein the recorded propagation properties comprise at least one of phase information and amplitude information from the transmitted and received signals.

8. The method of claim 1, wherein the calculation of a difference between the recorded propagation properties involves identification of at least one of a phase difference or an amplitude difference between the recorded propagation properties.

9. The method of claim 1, wherein the determined distance to the surface of the filling material is used for a high-level or overfill alarm functionality.

10. The method of claim 9, wherein the high-level or overfill alarm functionality involves comparing the determined distance to the surface of the filling material to at least one predetermined level threshold value.

11. The method of claim 10, wherein high-level or overfill alarm functionality involves identifying if a difference above a certain level between the first and second propagation properties or the third and fourth propagation properties occurs within a predetermined high level zone.

12. The method of claim 9, wherein the high-level or overfill alarm functionality involves identifying if a difference above a certain level between the first and second propagation properties or the third and fourth propagation properties occurs within a predetermined high level zone.

13. The method of claim 1, wherein continuous signals are emitted, and wherein distances are calculated based on a phase difference between the received echo signal and a reference signal.

14. The method of claim 1, wherein emit pulsed signals are emitted, and wherein distances are calculated based on the time between the emission of a pulsed signal and the reception of the echo of said signal.

15. The method of claim 1, wherein the received signals are filtered for reducing noise related changes before recording of the propagation properties, or before using said recorded propagation properties for calculating a difference.

16. The method of claim 1, wherein only primary echo signals are considered for recording of propagation properties, whereas secondary double-bounce echoes are disregarded.

17. The method of claim 1, further comprising the step of initially assuming that the first and second surface echoes or the third and fourth surface echoes are reflected from the surface of the filling material, whereby if the step of selecting the greatest of said first and second differences associates a different surface echo with the surface of the filling material, the assumption is thereafter changed to the now selected surface echoes.

18. The method of claim 17, wherein in use, the initial assumption is always tested and if necessary corrected within a limited time period, said time period being at least one of: less than one hour, less than one minute and less than 10 seconds.

19. The method of claim 1, wherein the surface of the filling material having reflective properties and the surface of the interfering structure having reflective properties are so much separated that the echo signals originating from said surfaces are distinguishable from each other.

20. The method of claim 1, wherein the temporal separation between at least one of the first and second times and the third and fourth times is less than a maximum separation time, said maximum separation time being one of one hour, one minute and 10 seconds.

21. The method of claim 1, wherein the determining of said distance to the selected surface of the filling material is based on at least one of the recorded propagation properties.

22. A method for microwave signal based gauging of a distance to a surface with reflective properties at a filling level of a filling material in a tank having at least one interfering structure, comprising:
transmitting at least two temporally separated times transmit signals into the tank, and subsequently receiving receive signals including surface echoes;
recording propagation properties of the transmit and receive signals in association with at least two distinguishable reflective surfaces;
calculating for each distinguishable reflective surface a difference in the recorded propagation properties between the at least two temporally separated times;
comparing the calculated differences for the at least two distinguishable reflective surfaces;
selecting the greatest of said differences as the difference associated with the surface of the filling material; and
determining said distance to said surface of the filling material based on propagation properties of transmitted and received signals.

23. The method of claim 22, further comprising the step of calculating, based on the recorded propagation properties, distances to reflective surfaces in the tank, and wherein the difference between the propagation properties is calculated as the difference between said calculated distances.

24. The method of claim 22, wherein the recorded propagation properties comprises at least one of phase information and amplitude information from the transmitted and received signals.

25. The method of claim 22, wherein the calculation of a difference between the recorded propagation properties involves identification of at least one of a phase difference or an amplitude difference between the recorded propagation properties.

26. The method of claim 22, wherein the determined distance to the filling material is used for a high-level or overfill alarm functionality.

27. The method of claim 22, wherein continuous signals are emitted, and wherein distances are calculated based on a phase difference between the received echo signal and a reference signal.

28. The method of claim 22, wherein emit pulsed signals are emitted, and wherein distances are calculated based on the time between the emission of a pulsed signal and the reception of the echo of said signal.

29. The method of claim 22, wherein the received signals are filtered for reducing noise related changes before recording of the propagation properties, or before using said recorded propagation properties for calculating a difference.

30. The method of claim 22, wherein the transmitting and receiving are repeated at least three temporally separated times, wherein a trend value or average value based on said recorded propagation properties is used for calculation of the differences in the recorded propagation properties between the at least two temporally separated times.

31. The method of claim 22, wherein only primary echo signals are considered for recording of propagation properties, whereas secondary double-bounce echoes are disregarded.

32. The method of claim 22, wherein the determining of said distance to the selected surface of the filling material is based on at least one of the recorded propagation properties.

33. A radar level gauge system for determining a distance to a surface with reflective properties at a filling level of a filling material in a tank having at least one interfering structure, comprising:
a transmitter for transmitting measuring signals towards the surface of the filling material;
a receiver for receiving echo signals from the tank;
a storage for recording propagation properties of the transmitted and received signals in association with at least two distinguishable reflective surfaces;
processing circuitry for calculating for each distinguishable reflective surface a difference in the recorded propagation properties between at least two temporally separated times, and selecting the greatest of the calculated differences for the at least two distinguishable reflective surfaces as the difference associated with the surface of the filling material, and determining said distance to the selected surface of the filling material based on propagation properties of transmitted and received signals.

34. The radar level gauge system of claim 33, wherein the storage is adapted to record propagation properties comprising at least one of phase information and amplitude information from the transmitted and received signals.

35. The radar level gauge system of claim 33, wherein the processing circuitry is adapted to calculate a difference between the recorded propagation properties based on at least one of a phase difference or an amplitude difference between the recorded propagation properties.

36. The radar level gauge system of claim 33, wherein it is usable as a high-level or overfill alarm.

37. The radar level gauge system of claim 33, wherein the transmitter is adapted to emit continuous signals, and wherein the processing circuitry is adapted to calculate the distances based on a phase difference between the received echo signal and a reference signal.

38. The radar level gauge system of claim 33, wherein the transmitter is adapted to emit pulsed signals, and wherein the processing circuitry is adapted to calculate distances based on the time between the emission of a pulsed signal and the reception of the echo of said signal.

39. The radar level gauge system of claim 33, further comprising filtering means for filtering the received signals for reducing noise related changes before recording of the propagation properties, or before using said recorded propagation properties for calculating a difference.

40. A method for microwave signal based determination of a high-level or overfill situation for the filling level of a filling material in a tank having a surface with reflective properties, comprising:

transmitting at a first time first transmit signals towards the surfaces;

receiving at essentially said first time first receive signals including a first surface echo;

recording first propagation properties of the first transmit and receive signals associated with the first surface echo;

transmitting at a second time second transmit signals towards the surfaces;

receiving at essentially said second time second receive signals including a second surface echo;

recording second propagation properties of the second transmit and receive signals associated with the second surface echo;

wherein the first time and the second time are temporally separated by a first separation time;

calculating a first difference between the first and second propagation properties;

determining a distance to the surface of the filling material based on propagation properties of transmitted and received signals;

identifying if the difference exceeds a predetermined difference level and if the determined distance is within a predetermined high level zone, and if so setting the alarm.

* * * * *

UNITED STATES PATENT AND TRADEMARK OFFICE
CERTIFICATE OF CORRECTION

PATENT NO. : 7,284,425 B2 Page 1 of 1
APPLICATION NO. : 11/038836
DATED : October 23, 2007
INVENTOR(S) : Tomas Wennerberg It is certified that error appears in the above-identified patent and that said Letters Patent is hereby corrected as shown below:

Title page Item (73) Assignee:

Change "Gothenburg" to --Goteborg--.

Signed and Sealed this

Ninth Day of February, 2010

David J. Kappos
*Director of the United States Patent and Trademark Office*